(12) United States Patent
Ruddell et al.

(10) Patent No.: US 9,212,761 B2
(45) Date of Patent: Dec. 15, 2015

(54) SECURITY DEVICE

(71) Applicants: Christian Michael Ruddell, Hemet, CA (US); Timothy Daniel Manning, Hemet, CA (US)

(72) Inventors: Christian Michael Ruddell, Hemet, CA (US); Timothy Daniel Manning, Hemet, CA (US)

( * ) Notice: Subject to any disclaimer, the term of this patent is extended or adjusted under 35 U.S.C. 154(b) by 156 days.

(21) Appl. No.: 14/026,447

(22) Filed: Sep. 13, 2013

(65) Prior Publication Data

US 2015/0075646 A1 Mar. 19, 2015

(51) Int. Cl.
*F16K 35/00* (2006.01)
*F16K 27/12* (2006.01)

(52) U.S. Cl.
CPC .............. *F16K 35/00* (2013.01); *F16K 27/12* (2013.01); *Y10T 137/7062* (2015.04)

(58) Field of Classification Search
CPC ........................................................ F16K 35/00
USPC .......... 137/296, 294, 382, 377; 248/649, 574, 248/616, 125.1, 670, 188.2, 188.5
See application file for complete search history.

(56) References Cited

U.S. PATENT DOCUMENTS

| | | | | |
|---|---|---|---|---|
| 1,054,719 A * | 3/1913 | Seamon | ........................ | 137/377 |
| 1,084,996 A * | 1/1914 | Wright | ............................ | 70/178 |
| 1,690,461 A * | 11/1928 | Sieben | .......................... | 137/382 |
| 2,305,870 A * | 12/1942 | Haberstump | .............. | 248/188.5 |
| 2,531,778 A * | 11/1950 | Merner | ......................... | 108/116 |
| 2,746,822 A * | 5/1956 | Copenhaver | ............... | 248/188.5 |
| 4,669,500 A | 6/1987 | Strelow | | |
| 4,890,638 A * | 1/1990 | Davenport | .................... | 137/382 |
| 5,226,264 A | 7/1993 | Walters | | |
| 5,294,195 A | 3/1994 | Amr et al. | | |
| 5,522,420 A * | 6/1996 | Martin | .......................... | 137/343 |
| 5,638,858 A * | 6/1997 | Gettinger et al. | ............. | 137/382 |
| 5,711,341 A | 1/1998 | Funderburk et al. | | |
| 5,740,832 A * | 4/1998 | Griffin et al. | ................. | 137/341 |
| 5,743,289 A * | 4/1998 | Griffin et al. | ................. | 137/341 |
| 5,791,098 A * | 8/1998 | Thomas | ....................... | 52/169.6 |
| 5,794,655 A | 8/1998 | Funderburk et al. | | |
| 5,957,156 A * | 9/1999 | Hartley | ......................... | 137/377 |
| 5,996,611 A * | 12/1999 | Griffin et al. | ................. | 137/341 |
| 6,021,804 A * | 2/2000 | Griffin et al. | ................. | 137/341 |
| 6,158,175 A | 12/2000 | Carter et al. | | |
| 6,170,281 B1 | 1/2001 | Barnett | | |

(Continued)

FOREIGN PATENT DOCUMENTS

| AU | 2006101008 A4 | 2/2007 |
|---|---|---|
| AU | 2006101008 B4 | 7/2008 |

(Continued)

*Primary Examiner* — Craig Schneider
*Assistant Examiner* — Daniel P Donegan

(57) ABSTRACT

A security device is configured to limit access and prevent removal of a backflow preventer connected to a fire hydrant. The security device includes an upper enclosure rotationally and detachably coupled to a lower enclosure. The upper enclosure has an upper enclosure left end and the lower enclosure comprises a lower enclosure left end each being configured to accommodate a portion of the fire hydrant. An upper access door is attached to the upper enclosure and permits and restricts access to the backflow preventer. A side door is attached to the lower enclosure and permits and restricts access to the backflow preventer to install a hose to the backflow preventer. A plurality of height adjustment legs are attached to the lower enclosure to adjust a height of the lower enclosure from ground and to carry weight of the security device which avoids plastic deformation of the backflow preventer.

4 Claims, 6 Drawing Sheets

(56) References Cited

U.S. PATENT DOCUMENTS

| | | |
|---|---|---|
| 6,186,158 B1 | 2/2001 | Goarin |
| 6,209,574 B1 * | 4/2001 | Prewitt ............................ 137/382 |
| 6,532,985 B1 * | 3/2003 | Griffin et al. .................. 137/341 |
| 6,561,215 B1 * | 5/2003 | Wakefield ...................... 137/364 |
| 6,595,017 B1 | 7/2003 | Teahan |
| 7,201,190 B2 * | 4/2007 | Warning ........................ 137/899 |
| 7,243,674 B2 * | 7/2007 | Devine ........................... 137/375 |
| 7,707,798 B1 | 5/2010 | Cullinan |
| 2002/0011268 A1 * | 1/2002 | Cho et al. ....................... 137/377 |
| 2006/0005881 A1 * | 1/2006 | Borrenpohl et al. ........... 137/377 |
| 2010/0170580 A1 * | 7/2010 | Bott et al. ...................... 137/377 |
| 2014/0116536 A1 * | 5/2014 | Resendiz ....................... 137/377 |
| 2014/0196792 A1 * | 7/2014 | Torres-Leon ..................... 137/1 |
| 2015/0000767 A1 * | 1/2015 | Ball et al. ...................... 137/382 |

FOREIGN PATENT DOCUMENTS

| | | |
|---|---|---|
| EP | 1046866 A1 | 10/2000 |
| EP | 1921395 A2 | 5/2008 |
| EP | 1921395 A3 | 1/2011 |
| EP | 2369258 A2 | 9/2011 |
| EP | 2369258 A3 | 10/2012 |
| GB | 2410544 A | 8/2005 |
| GB | 2410544 B | 3/2008 |

\* cited by examiner

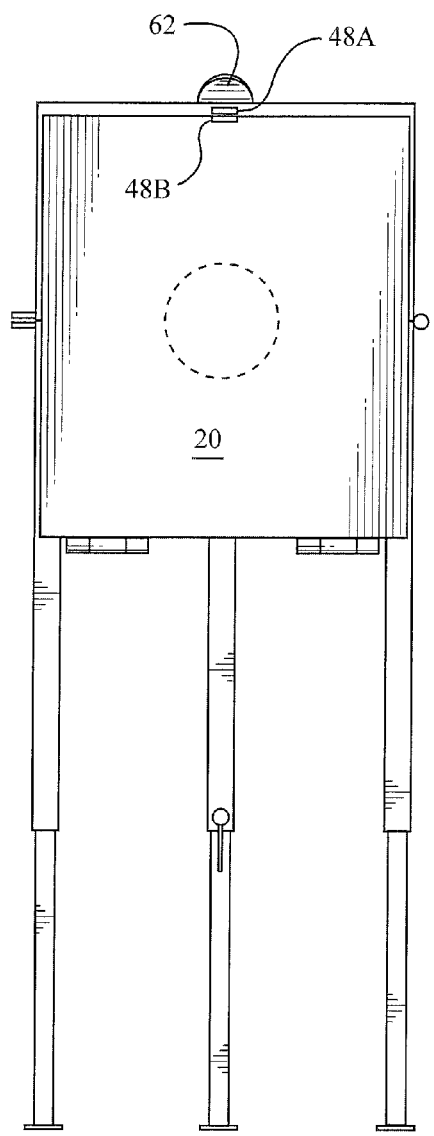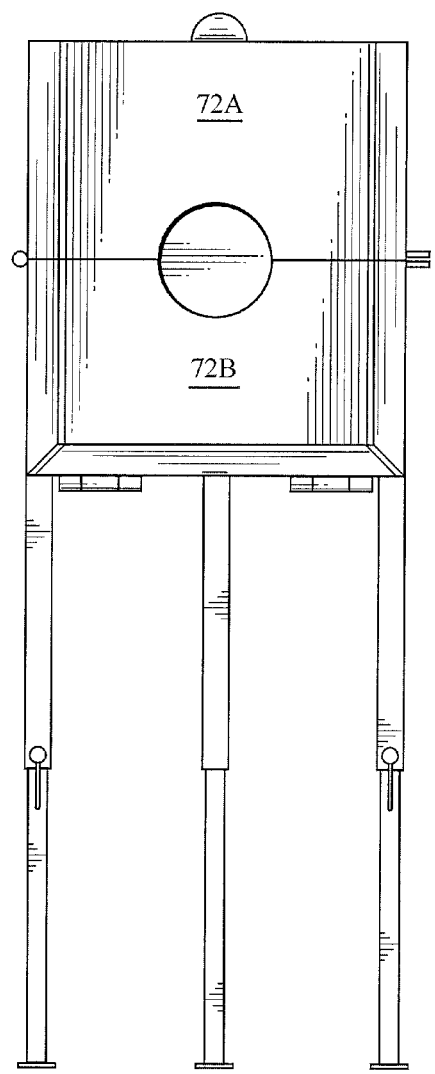
Fig. 7
Fig. 6

SECURITY DEVICE

BACKGROUND

The embodiments herein relate generally to devices that can be configured to prevent theft of portable metal objects.

Prior to embodiments of the disclosed invention, backflows assemblies and T-meters were being stolen off of fire hydrants at an astounding pace. These stolen assemblies are becoming extremely costly for developers and construction projects, which add to construction costs. The prior art includes, U.S. Pat. No. 5,711,341 issued to Funderburk; European Patent Application 2,369,258 filed by Cappellari; U.K. Patent 2,410,544 issued to Simpson; European patent application 1,046,866 filed by Correia; U.S. Pat. No. 6,158,175 issued to Carter; U.S. Pat. No. 6,186,158 issued to Goarin; European Patent Application 1,921,395 issued to Forestan; International Bureau Patent application 2008/104700 filed by Testa; European patent application 2010/0194899 filed by Cappelari; U.S. Pat. No. 5,226,264 issued to Walters; U.S. Pat. No. 5,294,195 issued to Amr; U.S. Pat. No. 6,170,281 issued to Barnett; Australian patent application 2006/101008 filed by Fisher; U.S. Pat. No. 6,595,017 filed by Teahan; U.S. Pat. No. 7,707,798 filed by Cullinan; U.S. Pat. No. 4,669,500 issued to Strelow; and U.S. Pat. No. 5,794,655 issued to Funderburk One primary theory for backflow preventers involved a series of swing check valves in parallel as shown in the Funderburk references. However, these valves could be tampered with and stolen as metal theft would increase in frequency in the generation between Funderburk's valves and embodiments of the present invention. Strelow points out that in undersea valves in the North Atlantic Ocean, valves have been placed in cases closed with latches, however, these cages provided easy access to the valve, because theft in that environment is unlikely.

While the concept of an enclosure to protect a temporary backflow preventer attached to a fire hydrant is without precedent, there are some other theories of protecting metal from theft in other fields. For instance in both Cappellari references (collectively Cappellari), Correia, Fisher, and Testa an enclosure is used to cover an HVAC device with a door that can be used to access the device without disrupting the rest of the enclosure. In Simpson, a radiator cover has an access panel to accomplish the same function as the door in Cappellari and Correia. In Goarin, mesh is used to improve airflow in such a structure. In Forestan, ventilation fins are used to improve airflow in such a structure.

Cappellari, Simpson, Correia, Fisher and Correia do not teach a system that can accommodate an appliance which is designed to be raised from a perpendicular surface, as opposed to being immediately adjacent to the perpendicular surface. Likewise, these references relate to permanent structures, not temporary structures that relate to temporary piping.

The perpendicular surface need not be the ground as in Cappellari, Simpson, and Correia. For instance, in Carter, the enclosure is attached to a wall to protect a wall mounted air conditioner. Embodiments of the present invention solve this problem with legs.

Where the permanent structures prevent theft, they do not provide a user the ability to move the structure and metal to another location. Walters, Cullinan and Teahan teach a portable shelter for an air conditioner that utilizes a series of wheels or screens to block sun from the air conditioner. To the contrary, Barnett teaches a detachable shield that increases the heat within the enclosure for the purpose of heating a heat pump. However, none of these structure can offer a theory of preventing metal theft. Temporary structures are interested in protection from the elements and not from thieves.

The scope to which these enclosures can be modified is exemplified in Amr, which discusses mechanical and electrical changes that can be made to an air conditioner enclosure that can accommodate a split vapor compression system. However, there is no theory of how to accommodate a temporary system or an elevated system.

SUMMARY

A security device is configured to limit access and prevent removal of a backflow preventer connected to a fire hydrant. The security device includes an upper enclosure rotationally and detachably coupled to a lower enclosure. The upper enclosure has an upper enclosure left end and the lower enclosure comprises a lower enclosure left end each being configured to accommodate a portion of the fire hydrant. An upper access door is attached to the upper enclosure and permits and restricts access to the backflow preventer. A side door is attached to the lower enclosure and permits and restricts access to the backflow preventer to install a hose to the backflow preventer. A plurality of height adjustment legs are attached to the lower enclosure to adjust a height of the lower enclosure from ground and to carry weight of the security device which avoids plastic deformation of the backflow preventer.

In some embodiments, a right handle and a left handle are mechanically coupled to the lower enclosure to facilitate moving the security device. A front leg is connected to the lower enclosure and angled to avoid irregular protrusions on the fire hydrant while still supporting the weight of the backflow preventer. A grated portion is mechanically coupled to the lower enclosure to permit water from the backflow preventer to drain through the lower enclosure.

BRIEF DESCRIPTION OF THE FIGURES

The detailed description of some embodiments of the invention is made below with reference to the accompanying figures, wherein like numerals represent corresponding parts of the figures.

FIG. 6 shows a side view of an embodiment of the present invention in a closed configuration with the side door closed.

FIG. 7 shows a side perspective view of an embodiment of the present invention in a closed configuration with the side door closed.

DETAILED DESCRIPTION OF CERTAIN EMBODIMENTS

Figure 1:
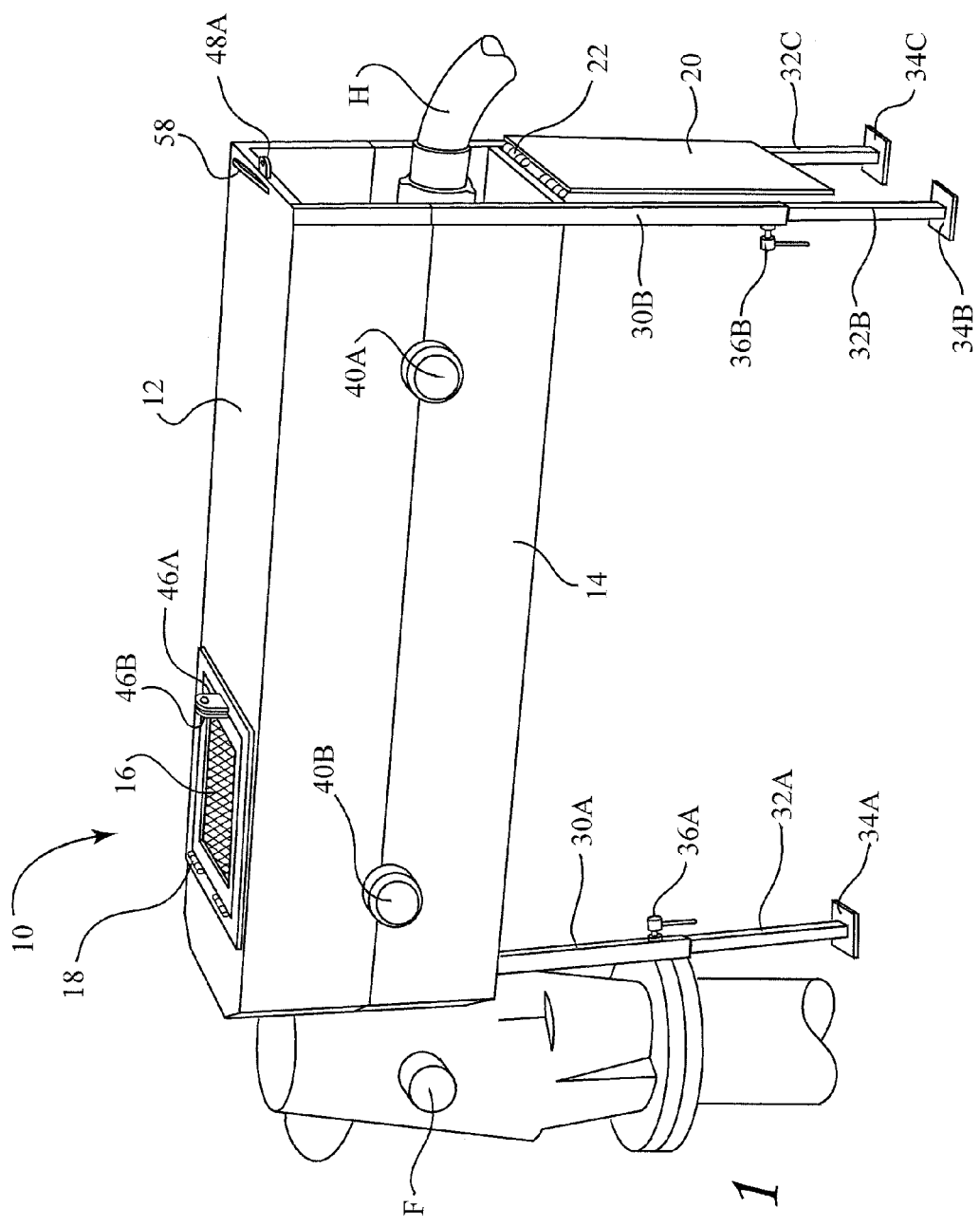
FIG. 1 shows a front perspective view of an embodiment of the present invention in a closed configuration.

By way of example, and referring to FIG. 1, one embodiment of security device 10 comprises upper enclosure 12 detachably coupled and rotationally coupled to lower enclosure 14. Upper enclosure 12 is mechanically coupled to upper access door 16 with upper access door hinges 18. Lower enclosure 14 is mechanically coupled to side door 20 with side door hinges 22.

Lower enclosure 14 is further mechanically coupled to a plurality of height adjustment legs 30. Left leg upper portion 30A is immediately adjacent to left leg lower portion 32A. Left leg lower portion 32A is mechanically coupled to left leg foot 34A. The height of left leg lower portion 32A can be adjusted by using left leg tightening mechanism 36A.

Similarly, front leg upper portion 30B is immediately adjacent to front leg lower portion 32B. Front leg lower portion 32B is mechanically coupled to front leg foot 34B. The height of front leg lower portion 32B can be adjusted by using front leg tightening mechanism 36B.

Likewise, rear leg upper portion 30C is immediately adjacent to rear leg lower portion 32C. Rear leg lower portion 32C is mechanically coupled to rear leg foot 34C. The height of rear leg lower portion 32C can be adjusted by using tightening mechanism 36C.

Figure 2:
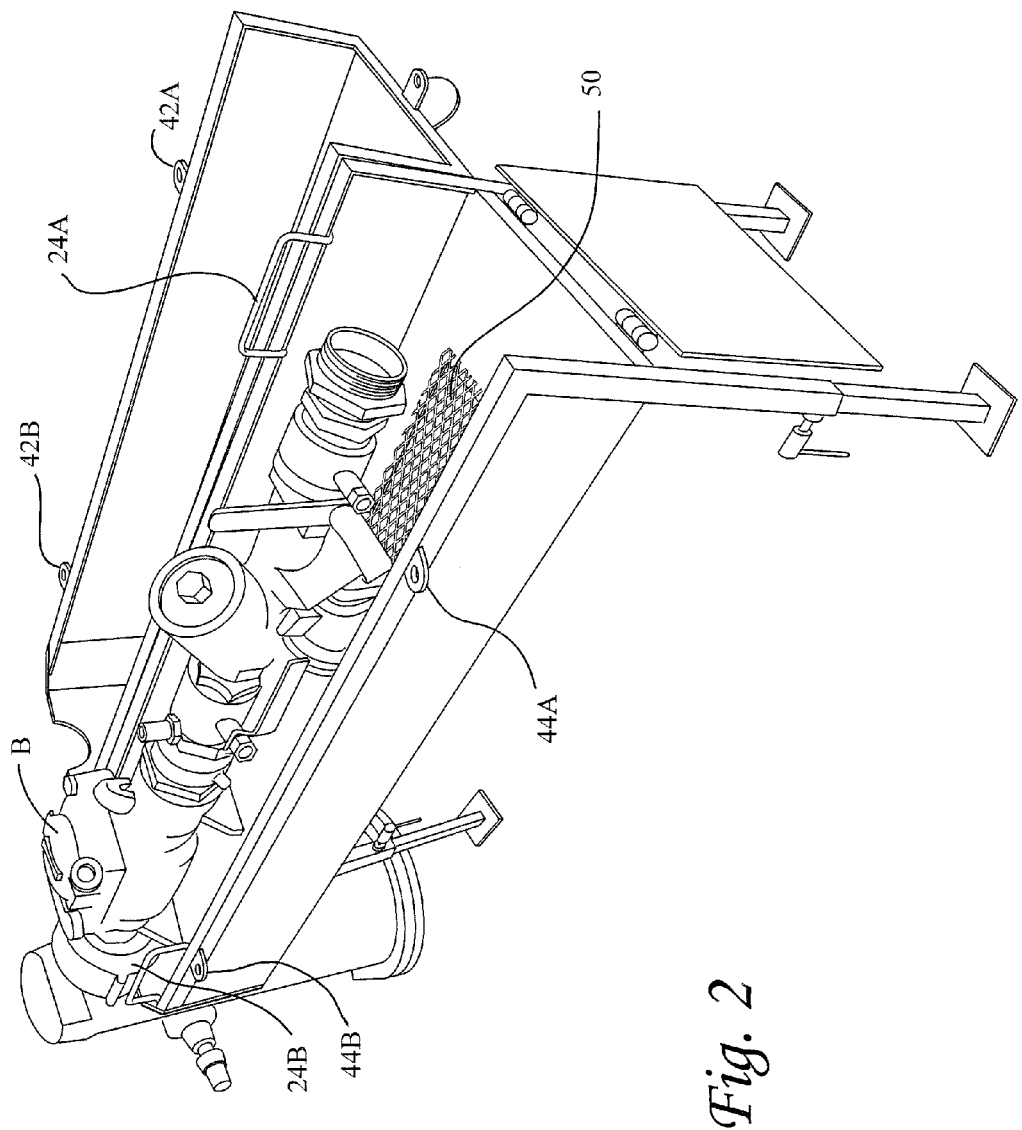
FIG. 2 shows a front perspective view of an embodiment of the present invention in an open configuration.

Turning to FIG. 2, security device 10 is configured to protect backflow assembly B which is detachably coupled to fire hydrant F while permitting access to hose H for water flow as desired by a user. One of the advantages of security device 10 is its portability. Unlike Walters, Cullinan and Teahan which use wheels for this effect, backflow preventers are located in remote areas that lack smooth surfaces that readily accommodate wheels. Embodiments of the present invention solve this problem by mechanically coupling right handle 24A and left handle 24B to lower enclosure 14. In situations where wheels could be appropriate they could be used in other embodiments of the present invention as well.

One challenge of using an elevated temporary security device as oppose to a permanent cage such as in Cappellari, Correia, Fisher, and Testa is the problem of festering water. A solution to that problem is attaching grated portion 50 to lower enclosure 14 immediately beneath an area, or a reasonable range of areas where hose H would be attached to backflow preventer B.

There are three ways in which security device is configured to prevent unauthorized access to backflow preventer B. In the first secure mode, upper enclosure 12 is mechanically coupled to right upper enclosure loop 42A and left upper enclosure loop 42B. Lower enclosure 14 is mechanically coupled to right lower enclosure loop 44A and left lower enclosure loop 44B. A user can bind right upper enclosure loop 42A and right lower enclosure loop 44A with right lock 40A. Likewise, a user can bind left upper enclosure loop 42B and left lower enclosure loop 44B with left lock 40B.

In a second secure mode, upper enclosure 12 is mechanically coupled to upper loop 46A. Upper access door 16 is mechanically coupled to upper access door loop 46B. A user can bind upper loop 46A and upper access door loop 46B with a lock 40 (not shown). By leaving upper access door unlocked a user can permit access to backflow preventer B for adjustment without permitting removal of backflow preventer B.

Figure 3:
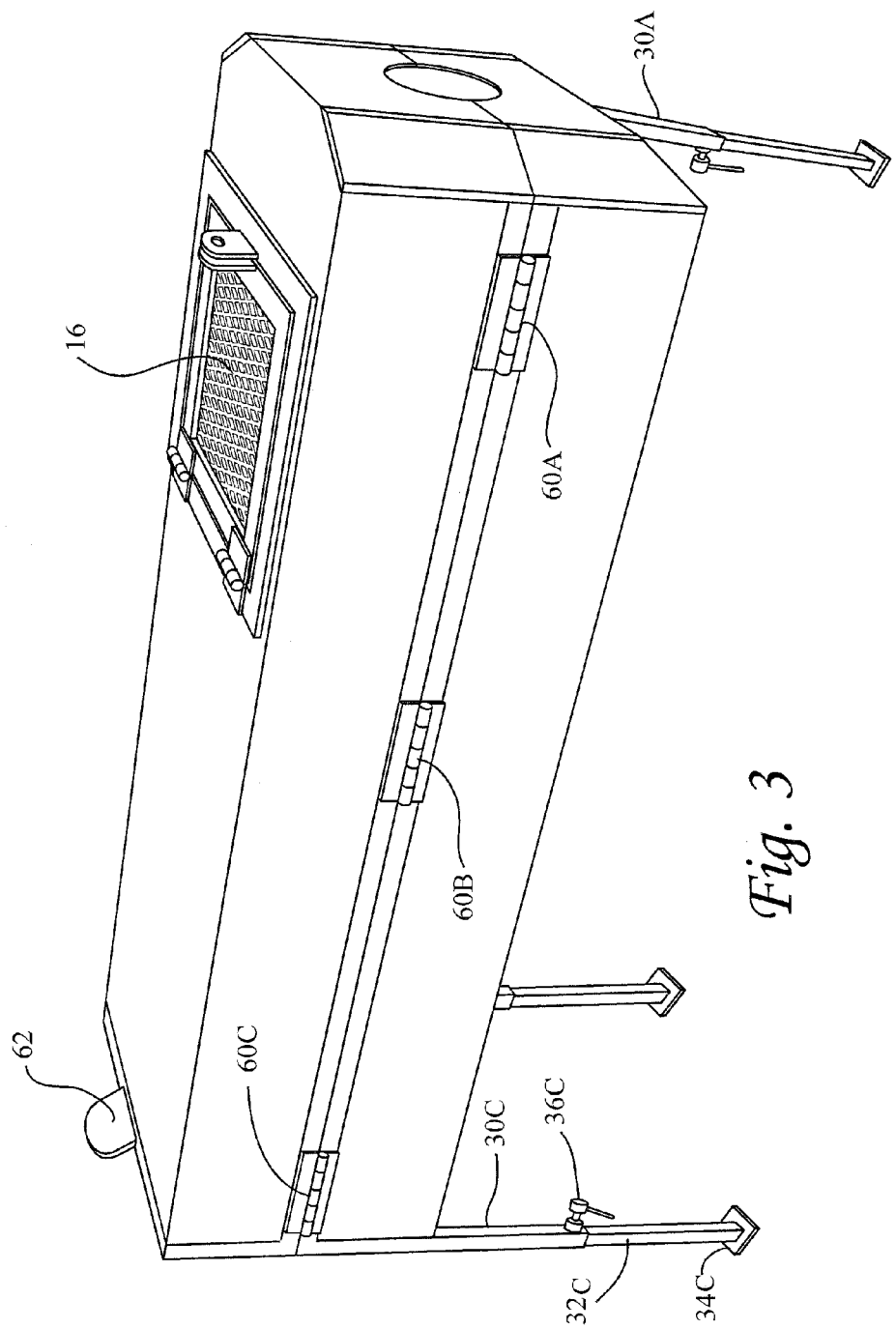
FIG. 3 shows a rear perspective view of an embodiment of the present invention in a closed configuration.

In a third secure mode, shown in FIG. 3 and FIG. 6, upper enclosure 12 is mechanically coupled to upper side door loop 48A. Side door 20 is mechanically coupled to side door loop 48B. A user can join upper side door loop 48A and side door loop 48B with a lock 40 (not shown). By leaving side door 20 unlocked a user can permit access to backflow preventer B for installing hose H without permitting removal of backflow preventer B. Access to side door loop 48B can be restricted by installing semicircular plate 62 onto upper enclosure 12 which limits access to lock 40, when installed.

Turning to FIG. 3, as noted above, upper enclosure 12 is rotationally coupled to lower enclosure 14. In some embodiments, upper enclosure 12 is mechanically coupled to first hinge 60A, second hinge 60B and third hinge 60C. First hinge 60A, second hinge 60B and third hinge 60C are further mechanically coupled to lower enclosure 14. A user can rotate upper enclosure 12 about lower enclosure 14 using first hinge 60A, second hinge 60B and third hinge 60C.

One problem, raised but not solved by Funderburk and Sterlow is that irregular shaped valves cannot easily accommodate a box shaped enclosure. Neither Funderburk nor Sterlow offers a solution to this problem, but the embodiments of the present invention shows that when left leg 30A is inclined at approximately 10 to 30 degrees front leg 30A will be configured to avoid irregular protrusions on fire hydrant F, while still providing support for itself such that the weight of security device 10 is born by legs 30 and not fire hydrant F or backflow preventer B. This prohibits plastic deformation of backflow preventer B over time.

Figure 4:
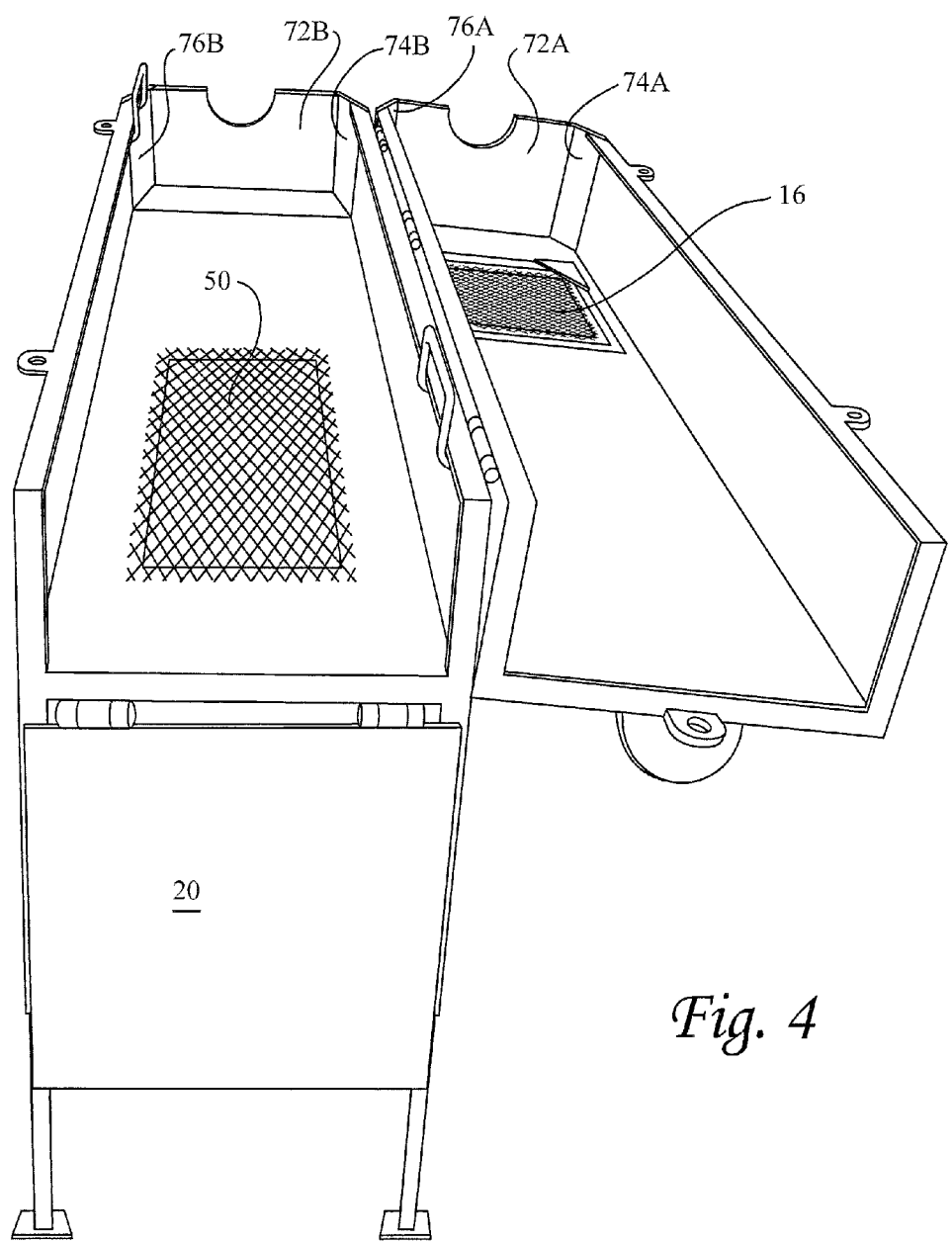
FIG. 4 shows a side perspective view of an embodiment of the present invention in an open configuration.
Figure 5:
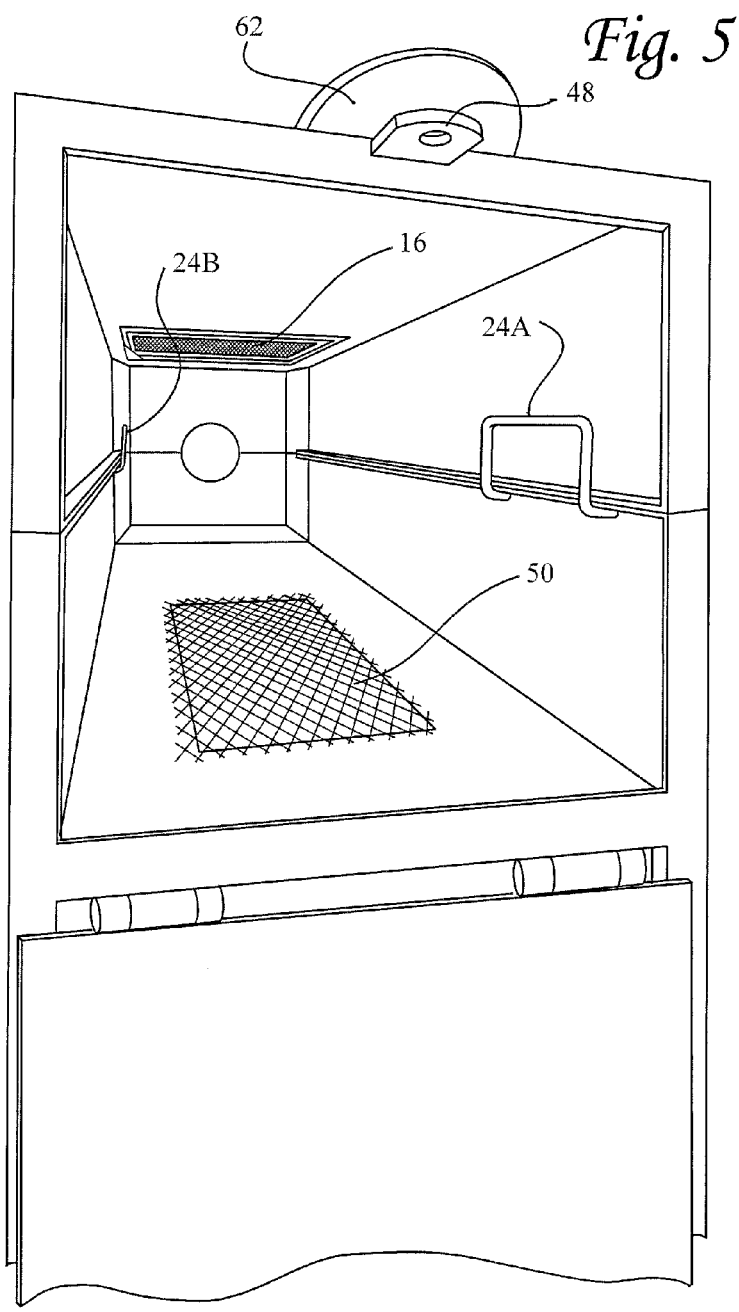
FIG. 5 shows a side perspective view of an embodiment of the present invention in a closed configuration with the side door open.

Another theory for accommodating the irregular geometry of fire hydrant F is shown in FIG. 4, FIG. 5 and FIG. 7. Upper enclosure 12 comprises upper enclosure left end 72A mechanically coupled to upper enclosure left end front corner 74A and upper enclosure left end rear corner 76A. Upper enclosure left end 72A has a generally rectangular with a side comprising a hemispherical recess to accommodate a portion of fire hydrant F which is more narrow than backflow preventer B such that, when closed, security device 10 will not slide off fire hydrant F or backflow preventer B.

Likewise, lower enclosure 14 comprises lower enclosure left end 72B mechanically coupled to lower enclosure left end front corner 76B and lower enclosure left end rear corner 74B. Lower enclosure left end 72B has a generally rectangular with a side comprising a hemispherical recess to accommodate a portion of fire hydrant F which is more narrow than backflow preventer B such that, when closed, security device 10 will not slide off fire hydrant F or backflow preventer B.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A security device configured to limit access and prevent removal of a backflow preventer connected to a fire hydrant, the security device comprising:
    an upper enclosure rotationally and detachably coupled to a lower enclosure wherein the upper enclosure further comprises an upper enclosure left end and the lower enclosure comprises a lower enclosure left end each being configured to accommodate a portion of the fire hydrant;
    wherein the upper enclosure further comprises an upper enclosure left end mechanically coupled to an upper enclosure left end front corner and an upper enclosure left end rear corner; wherein the upper enclosure left end has a generally rectangular shape with a side comprising a hemispherical recess to accommodate a portion of the fire hydrant which is more narrow than the backflow preventer such that, when closed, the security device will not slide off the fire hydrant or the backflow preventer;
    an upper access door mechanically coupled to the upper enclosure wherein the upper access door permits and restricts access to the backflow preventer;

a side door mechanically coupled to the lower enclosure wherein the side door permits and restricts access to the backflow preventer to install a hose to the backflow preventer;

a plurality of height adjustment legs mechanically coupled to the lower enclosure to adjust a height of the lower enclosure from ground and to carry weight of the security device.

2. The security device of claim 1, further comprising a right handle and a left handle mechanically coupled to the lower enclosure to facilitate moving the security device wherein the upper enclosure further comprises an upper enclosure right end mechanically coupled to an upper enclosure right end front corner and an upper enclosure right end rear corner; wherein the upper enclosure right end has a generally rectangular shape with a side comprising a hemispherical recess to accommodate a portion of the fire hydrant which is more narrow than the backflow preventer such that, when closed, the security device will not slide off the fire hydrant or the backflow preventer.

3. The security device of claim 1, further comprising a front leg connected to the lower enclosure and angled to avoid irregular protrusions on the fire hydrant while still supporting the weight of the backflow preventer.

4. The security device of claim 1, further comprising a grated portion mechanically coupled to the lower enclosure to permit water from the backflow preventer to drain through the lower enclosure.

\* \* \* \* \*